Patented Sept. 4, 1923.

1,467,007

UNITED STATES PATENT OFFICE.

HOWARD S. PAINE AND CHARLES F. WALTON, JR., OF WASHINGTON, DISTRICT OF COLUMBIA, DEDICATED, BY MESNE ASSIGNMENTS, TO THE PEOPLE OF THE UNITED STATES.

MAPLE PRODUCT.

No Drawing.      Application filed July 26, 1922. Serial No. 577,755.

(FILED UNDER THE ACT OF MARCH 3, 1883, 22 STAT. L., 625.)

*To all whom it may concern:*

Be it known that we, HOWARD S. PAINE and CHARLES F. WALTON, Jr., citizens of the United States of America, and employees of the Department of Agriculture of the United States of America, residing at Washington, District of Columbia, have jointly invented a new and useful Improved Maple Product, of which the following is a specification.

This application is made under the act of March 3, 1883, chapter 143 (22 Stat., 625) and the invention herein described and claimed may be used by the Government of the United States, its officers and employees and by any person in the United States either in public or private work without payment to us of any royalty thereon.

In the manufacture of maple cream, otherwise known as maple fondant, icing, or butter, considerable difficulty is experienced in uniformly securing a smooth, soft grain. The reason for this difficulty consists in the fact that the "purity" of the maple sirup or maple sugar from which the cream is made varies appreciably thereby rendering it difficult to secure a product of uniform texture by the practice of the customary standard method of manufacture. (By "purity" is meant the ratio of sucrose to the total solids.) In handling a fondant of high purity, for example, by the same method used for one of lower purity, the tendency is to produce a comparatively coarse, rough grain due to the too rapid growth of sucrose crystals after evaporating to supersaturation.

It is possible to secure the desired consistency by the addition during manufacture of a small amount of commercial glucose, or corn sirup, or of invert sugar from cane sugar, but in case this practice is adopted, a pure maple product will not be obtained.

It is also advocated at times that a partial inversion of the sucrose be accomplished by means of an acid. The use of acids will enable the manufacturer to produce cream of the proper consistency when the method is carefully controlled, but chemical control is frequently impossible and by using acid on low purity stock more harm is accomplished than good. When acid is used, moreover, the delicate maple flavor is frequently impaired.

We have discovered that a product of the desired texture can be prepared with very uniform results by the addition of a small amount of stock sirup which has been prepared by the action of the enzyme invertase. The fondant or maple cream may be prepared in the customary manner except that at some time during manufacture a certain amount of partially inverted pure maple sirup, used from stock, is added. Sufficient inverted maple sirup is thus incorporated in the cream to insure a uniform product of the smooth, soft consistency desired. By using at all times the same amount of inverted maple sirup, the differences in initial purity may be neglected with the surety of always obtaining a uniform product. An additional advantage consists in the fact that the product obtained by our process, since it possesses a smooth, soft texture, rather than a coarse, granular consistency, exhibits very much less tendency to deposit a layer of sirup on the surface after long-continued storage. The accumulation of sirup on the surface of maple cream as ordinarily prepared is most frequently observed when the grain is coarse. The formation of sirup in goods of this nature is very objectionable since on standing the thin sirup frequently ferments. Our process, furthermore, is preferable to the existing practice, in that during the creaming operation a mechanical beater, or stirrer, may be successfully used which is impracticable in manufactuing pure maple cream by the existing practice.

The process may be described more in detail as follows:—

To every 100 pounds of maple sirup of usual density (67–68° Brix at 60° F.) we add 6 pounds of partially inverted maple sirup (42° Bé. at 60° F., the sucrose content of which is approximately 50% inverted), cook to 238° F. and pour onto a cold slab or preferably into a mechanical beating or creaming machine. After permitting to cool to about 92–96° F. we commence to cream in the usual manner. When the "break" occurs, i. e. when the batch becomes "thinner" or "runny" as it is sometimes termed, we add 6 more pounds of the stock invert maple sirup and continue creaming until the batch becomes stiff. There should be no interruption in the process of creaming until the batch reaches the necessary consistency.

For "melting," or rendering the cream sufficiently fluid to pour into cans, a steam kettle or double boiler may be used, the cream being kept in constant motion. When fluid enough for mixing, we add 6 additional pounds of the invert maple sirup, and mix until the cream is of the consistency desired for pouring. During the entire period of heating, the temperature of the cream should at no time exceed 135° F.

We have found that the method thus described gives very satisfactory and uniform results. The proportions of invert maple sirup used, however, may be slightly altered, and also the details of the creaming operations, without substantially departing from the basic principle involved in the process.

Having thus described our invention, we claim:

A composition which comprises a mixture of maple sugar and invert sugar, said composition being substantially solid.

In testimony whereof, we affix our signatures in the presence of two subscribing witnesses.

HOWARD S. PAINE.
CHARLES F. WALTON, Jr.

Witnesses:
JOHN HAMILTON,
JOSEPH COHEN.